(No Model.)

J. & T. BUCKLEY.
CUSPIDOR.

No. 600,354. Patented Mar. 8, 1898.

WITNESSES:
Edward Thorpe
H. L. Reynolds.

INVENTORS
J. Buckley
T. Buckley.
BY
ATTORNEYS.

UNITED STATES PATENT OFFICE.

JOHN BUCKLEY AND THOMAS BUCKLEY, OF NEW YORK, N. Y.

CUSPIDOR.

SPECIFICATION forming part of Letters Patent No. 600,354, dated March 8, 1898.

Application filed July 15, 1897. Serial No. 644,619. (No model.)

*To all whom it may concern:*

Be it known that we, JOHN BUCKLEY and THOMAS BUCKLEY, of New York city, in the county and State of New York, have invented a new and Improved Cuspidor, of which the following is a full, clear, and exact description.

Our invention relates to improvements in cuspidors intended more particularly for use in hospitals and by invalids, but applicable to use in all places.

It consists, essentially, of an outer casing having a hinged top and bottom, provided with handles or other means by which they may be opened, and a cheap destructible inner casing formed, preferably, of paper or some similar material and which is discharged and destroyed when the cuspidor is cleaned.

Reference is to be had to the accompanying drawings, forming a part of this specification, in which similar characters of reference indicate corresponding parts in both views.

Figure 1:
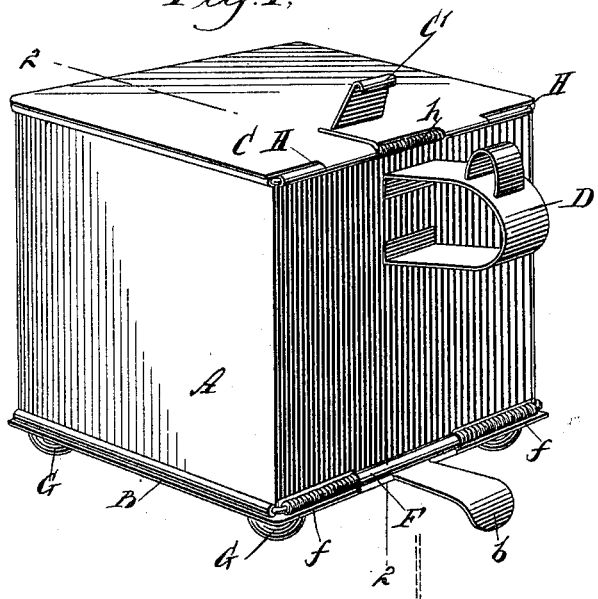
Figure 2:
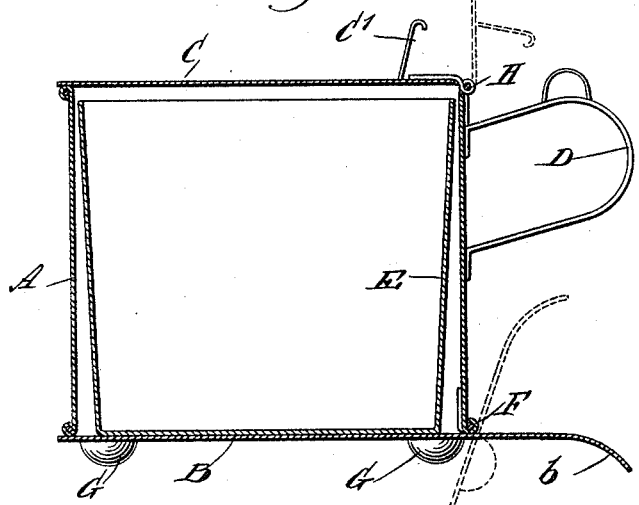

Figure 1 is a perspective view of the device, and Fig. 2 is a sectional view taken on the line 2 2 in Fig. 1.

Our device comprises an outer casing A, which is open at the top and bottom and has a top cover C, hinged at one edge upon a pin H, which passes through eyes upon the cover and the side of the casing. A spirally-coiled spring $h$ embraces the central portion of the pin H and engages the cover and the side of the casing, so as to hold the cover down upon the casing. The cover is also provided with a thumb catch or arm C′, which projects upward therefrom near the hinged edge. The casing A is provided with a handle D, by which it may be conveniently raised and carried from place to place. The bottom of the casing is closed by a plate B, hinged on a pin F and provided with a rearwardly-extending arm $b$, located beneath the handle D and so that it may be readily grasped by a finger of the same hand which holds the casing, so as to swing the plate into the position shown in dotted lines in Fig. 2.

The bottom plate B is provided with legs or knobs G, by which it is held slightly above the surface upon which the casing is placed. The pin F is also provided with a spirally-coiled spring $f$, which serves to hold the bottom plate B against the bottom of the casing. The spring F is preferably of sufficient strength to hold the bottom securely against the casing, while the spring $h$ should be a comparatively weak spring.

Within the casing is placed a lining E, formed as a box and closely fitting the inside of the casing. This lining is preferably made slightly larger at its upper than at its lower end, so that at its upper edge it will closely fit the casing, while at its lower edge it fits loosely therein. This lining E is preferably made of paper or some material which is inexpensive and which may be destroyed.

In using the device the cover C is raised by engaging the catch or arm C′ by the thumb, thus raising the cover into the position shown by dotted lines in Fig. 2. When it is desired to clean the cuspidor, the same can be accomplished by engaging the arm $b$ by one of the fingers and pulling it upward, thus swinging the bottom B down and permitting the lining or box E to drop out into a fire or any other receptacle desired. This effectually cleans the cuspidor and in such a way as to make very little trouble. It also enables the inner lining of the cuspidor to be destroyed, thus preventing the possibility of contagion therefrom. This device for hospital use will preferably be made small, so that it may be handled by the patient. It may, however, be made in any size desired for any particular purpose.

Having thus fully described our invention, we claim as new and desire to secure by Letters Patent—

1. A cuspidor, comprising a casing or box open top and bottom, a cover pivoted at one edge thereon and having a handle projecting therefrom, a spring to hold the cover closed, a plate pivoted upon the bottom edge of the box and acting as a closure therefor, a handle upon said plate projecting beyond its pivot, a spring acting upon said plate to maintain the closure of the box, and a lining formed as a cup fitting loosely in said casing or box, substantially as described.

2. A cuspidor, comprising a casing or box open top and bottom, a plate pivoted on one side of said box and closing the upper end thereof, a handle projecting from the upper surface of said plate near its pivot, a spring acting on the top plate to close it, a plate pivoted to the bottom of the box on the same side as the top plate and acting as a closure for the box, a handle projecting from said plate beyond its pivot, a spring acting to hold the same closed and to support its contents, a supporting or carrying handle fixed to the box between the top and bottom handles or arms, and a lining for the box formed as a loosely-fitting cup, substantially as described.

JOHN BUCKLEY.

THOMAS $\overset{\text{his}}{\times}$ BUCKLEY.
$\phantom{THOMAS \times}_{\text{mark}}$ Witnesses:
  JOHN COSTELLO,
  L. O. SHEA.